Oct. 31, 1933. W. GARSKE 1,932,403
FLOATING ROOF AND TANK
Filed Aug. 17, 1932
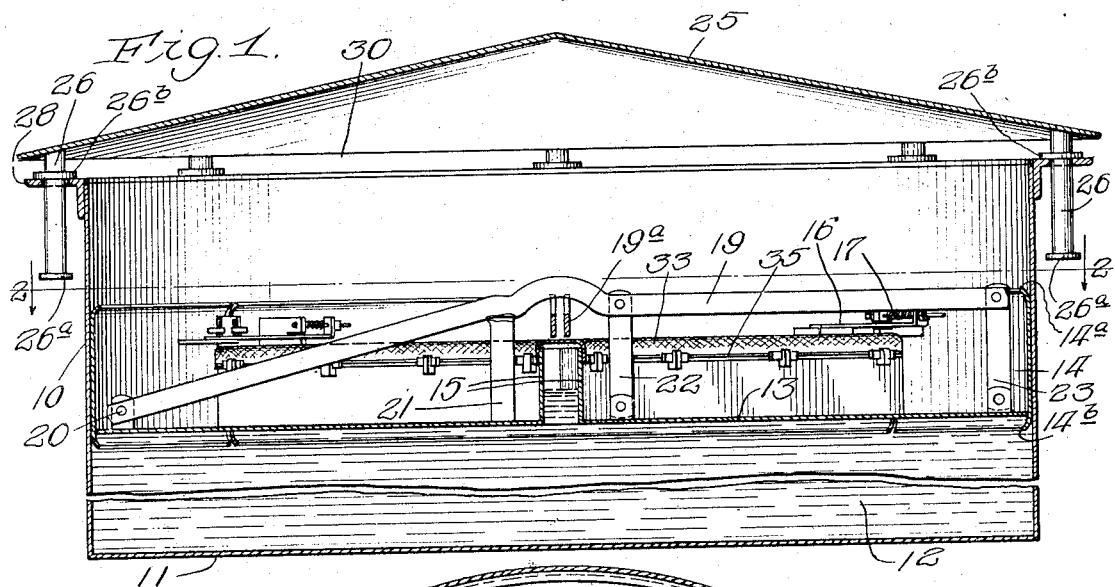
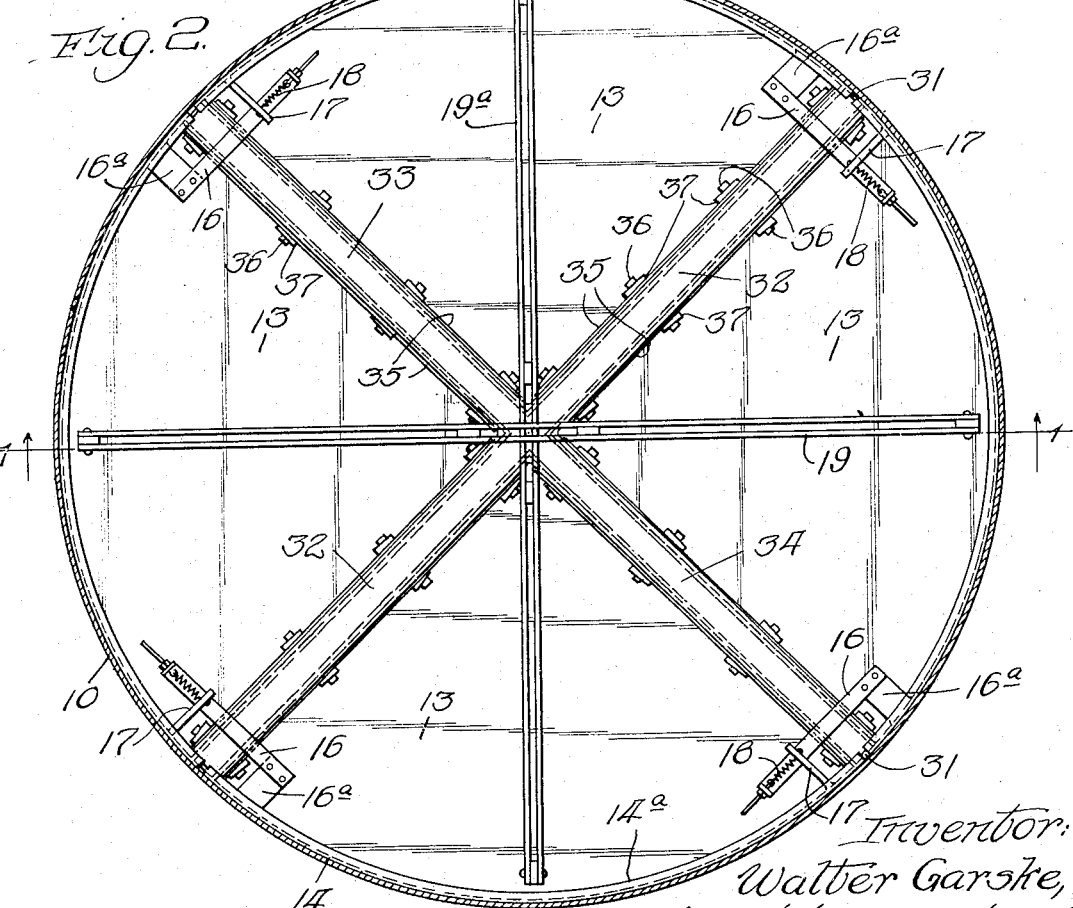
Inventor:
Walter Garske,
By Dynrenforth, Lee, Chritton & Wiles,
Attys.

Patented Oct. 31, 1933

1,932,403

UNITED STATES PATENT OFFICE 1,932,403

FLOATING ROOF AND TANK

Walter Garske, Birmingham, Ala., assignor to Chicago Bridge & Iron Company, a corporation of Illinois Application August 17, 1932. Serial No. 629,208

3 Claims. (Cl. 220—26)

This invention relates to improvements in floating roof and tank, and more especially a roof adapted to float on liquid in a tank, for example, a tank containing volatile oil.

For the purpose of illustrating the invention I have shown a floating roof adapted for use on a cylindrical oil tank. The roof is particularly adapted for use in connection with a tank of relatively small diameter, for example, a station tank.

Among the features of my invention is the provision of a roof that can be easily and cheaply made. My improved roof is so constructed that it can expand or contract more or less to adapt itself to inequalities in the diameter of the tank. In this way evaporation can be considerably lessened or eliminated by the use of a floating roof in a tank and without the use of any sealing means between the periphery of the roof and the shell or wall of the tank.

Another feature of my invention is the provision of a tank with a vertically movable weather roof, the floating roof being adapted to engage and lift the weather roof at the upper end of its travel. In this way, the upward movement of the roof is not limited, even though the same is provided with a relatively high upstanding peripheral rim.

Another feature of my invention is the provision of a floating roof including a plurality of sector shaped sections joined together by flexible walls with means for urging the sections apart, thus holding their periphery in contact with the wall of the tank. I also provide means for holding the sections substantially in the same plane, said means permitting relatively horizontal movement of said sections.

Other features and advantages of my invention will appear more fully as I proceed with my specification.

In that form of device embodying the features of my invention shown in the accompanying drawing, Figure 1 is a vertical sectional view, and Figure 2 is a view taken as indicated by the line 2 of Figure 1.

As shown in the drawing, the tank is formed by the cylindrical side wall 10 and bottom 11. The floating roof includes four quarter sector shaped sections each in the form of a pan with an upstanding rim about its entire periphery so as to cause it to float upon the liquid 12 in the tank. Each of these sections is indicated by 13. The outer curved rim on each section as indicated by 14 is somewhat higher than the rims 15 on the straight sides. The upper edge of the outer curved rim is curved inwardly somewhat as indicated by 14a and the lower edge similarly formed as indicated by 14b, in order to assist the roof in riding over rivet heads, overlapping edges, or other inequalities or unevennesses that there may be on the inside of the tank wall 10.

Means are provided for urging the sections apart. As shown, such means include between each two adjacent sections a rod 16 with one end attached to the bracket 16a on one section and its other end extending through a hole in a bracket 17 attached to the adjacent section. A tension spring 18 has one end attached to the bracket 17 and the other end to the extreme end of the rod 16. The tension of the spring 18 urges the rod outwardly, thus separating the two sections of the roof.

Means are provided for holding the sections substantially in the same plane, said means permitting relative horizontal movement of said sections. As here shown, such means include two diametrically arranged bars arranged over the centers of opposite sections. Since the construction and operation of the two sets is the same, it is necessary to describe only one. For example, as shown in Figures 1 and 2, there may be provided the double bars 19 attached at one end to the center of the curved periphery of one section. The apex of this section is also attached to the bars 19 by the upright 21. The opposite section is attached to the bars 19 by the pivoted levers 22 and 23, one near the apex and the other near the periphery. The upper ends of the levers 22 and 23 are pivoted to the bars 19 and their lower ends are pivotally attached to the sector of the roof. It is to be understood that the pivotal connections are quite loose permitting considerable lost motion and side play. The loose pivoted connection of the roof sector through the links 22 and 23, to the bars 19 permit this sector to have considerable movement in a horizontal plane relative to the other sectors but limit considerably its movement out of the plane of the other sectors. The opposite two roof sectors are joined in a similar manner by the bars 19a which extend under the bars 19. The details of these connections are the same as the others and need not be described.

Over the tank I provide a conical weather roof 25 that is free to rise and fall. This roof is provided with depending bars 26 extending through suitable guide holes in the flange 28 attached to the tank. Each of the bars 26 is provided with an enlargement 26a at its lower end to limit the upward movement of the roof. When the floating roof rises toward the limit of its upward movement, the upper edge 14a of the rim will engage the weather roof 25. The latter is free to rise permitting the floating roof to move upwardly to the limit of its travel. The enlargements 26a will limit the upward movement of the weather roof as desired. The member 26 is also provided with collars 26b to limit the downward movement thereof and these are preferably so arranged that the conical roof can never descend low enough to completely close the top of the tank; but a ventilating crack 30 will always remain.

Flexible sealing means are provided for joining the sections. For the purpose of making this seal I prefer to use some substantially gas proof flexible fabric. Briefly, the seal can be constructed of seven separate pieces. Four short vertical pieces can be used to seal the gaps between the edges of the rims 14 at the shell. One strip can be used to entirely close one diameter with a few inches to spare at the center. Two separate pieces can be employed to close the other two radial spaces with their inner ends spliced or suitably fastened to the diametrical strip seal at the center. The four strips of fabric sealing the spaces between the edge of the rims 14 are indicated by 31, the long strip diametrically arranged is indicated by 32 and the other two strips by 33 and 34. Any suitable means may be employed for attaching the edges of the strips 32 and 33 to the rims 15. For example, as here shown, I employ for this purpose bars 35 held under hooks 36 by wedges 37.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

I claim:

1. A tank with a vertically movable weather roof, and a floating roof adapted to float on liquid in the tank, the floating roof adapted to engage and lift the weather roof at the upper end of its travel.

2. A circular floating roof, including; a plurality of sector-shaped sections; flexible seals joining said sections; means for urging the sections apart; and means for holding the sections substantially in the same plane while permitting relative horizontal movement of said sections, said means including a bar attached to one section and extending over an opposite section, and depending pivoted links connecting said bar to said opposite section.

3. A circular floating roof, comprising; a plurality of sector-shaped sections; flexible seals joining said sections; means for urging the sections apart; and means for holding the sections substantially in the same plane while permitting relative horizontal movement of said sections, said means including diametrically arranged bars, each attached to one section and extending over an opposite section, and depending pivoted links connecting said opposite sections to said bars.

WALTER GARSKE.